May 25, 1937. P. F. STOCKARD 2,081,607
DEVICE FOR FILLING CONTAINERS WITH SEMIFLUID MATERIAL
Filed July 23, 1935
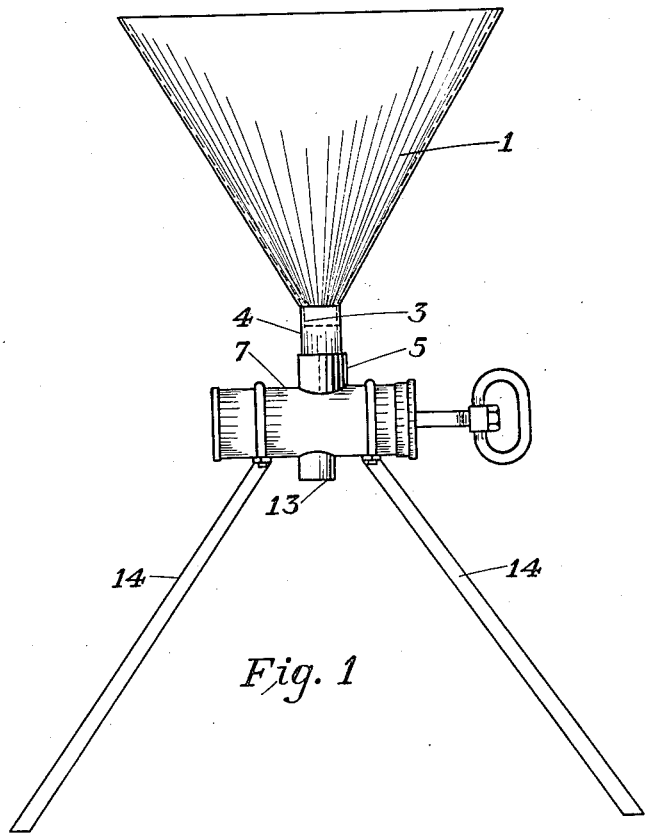
Fig. 1
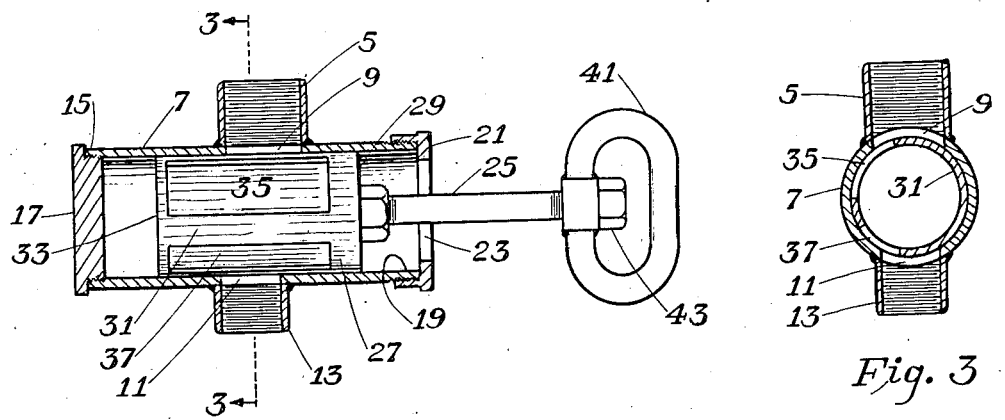
Fig. 2
Fig. 3
INVENTOR
Paul F. Stockard
BY Edward N. Lang
ATTORNEY Patented May 25, 1937

2,081,607

UNITED STATES PATENT OFFICE 2,081,607

DEVICE FOR FILLING CONTAINERS WITH SEMIFLUID MATERIAL

Paul F. Stockard, Marcus Hook, Pa., assignor to The Pure Oil Company, Chicago, Ill., a corporation of Ohio Application July 23, 1935, Serial No. 32,771

3 Claims. (Cl. 221—102)

This invention relates to method and apparatus for filling containers with semi-fluid material, and is more particularly concerned with apparatus for filling grease cans of small dimensions with a measured quantity of grease.

It is frequently necessary in plants which handle grease, lard, and other semi-fluid materials, to fill small orders ranging up to 1000 or 1500 cans. In filling orders of this size it is uneconomical to operate elaborate machinery which is capable of automatically filling containers with the material since the operation of such machinery involves considerable expense. I have devised an apparatus which is capable of filling orders of the size above mentioned in a rapid manner and with practically no cost for overhead expense since the apparatus is relatively inexpensive. Not only will the apparatus rapidly fill the containers but it will measure accurately the quantity of material to be placed in each container.

In order that my invention may be more fully understood, attention is directed to the following detailed description and the accompanying drawing, of which Fig. 1 is a diagrammatic elevational view of one form of apparatus made in accordance with my invention.

Fig. 2 is a vertical view, partly in cross section, of an element of the apparatus shown in Fig. 1.

Fig. 3 is a vertical cross sectional view of a part of the apparatus, taken on the line 3—3 of Fig. 2.

Referring to the drawing, numeral 1 indicates a hopper or container which may be of any suitable size or shape but which is shown as being funnel-shaped, having its lower end 3 connected to the pipe 4. For this purpose the lower end 3 of the hopper and the inside wall of the pipe 4 may be threaded so that the hopper may be screwed into the pipe; or the hopper may be set in the pipe 4 without screwing therein. The hopper may be suitably jacketed to permit passage of a heating or cooling fluid therethrough, or may be insulated to prevent heat loss. The lower end of the pipe 4 may be screwed into a collar 5, the inner wall of which is also threaded. The collar 5 is fastened preferably by welding to the top of a horizontally disposed cylinder 7 about midway between the ends thereof. The inner wall of the collar 5 coincides with the circumference of the opening 9 formed in the upper wall of cylinder 7. The lower end of the cylinder is formed with an opening 11, which is preferably directly under opening 9, and an outlet pipe 13 is fastened to the lower wall of the cylinder 7, preferably by welding thereto, in such a manner that the inner wall of the outlet 13 coincides with the circumference of the opening 11. The outlet pipe 13 may have its inner wall threaded to permit a nipple (not shown) to be screwed therein. In this manner nipples of various diameters may be screwed into the outlet to conform to various size containers which it is desired to fill. The cylinder and hopper are supported upon a suitable stand 14 which permits easy access to the outlet pipe 13.

The inner wall of the end 15 of the cylinder is threaded and closed by means of the cap 17 which is also threaded to permit the cap to be screwed into the end of the cylinder. The opposite end 19 of the cylinder has its outer wall threaded to permit a cap 21 to be screwed thereon. The cap 21 has a large central opening 23 in order to permit passage of the rod 25 therethrough and to provide free access of air to the end of the cylinder.

The inner wall of the cylinder 7 is suitably machined to permit the plunger element 27 to fit snugly therein. The plunger 27 is formed with a solid rear wall 29 and a skirt 31. The end 33 of the skirt 31 is entirely open. The skirt 31 is cylindrical in form and fits snugly within against the inner wall of the cylinder 7. A clearance of approximately .003 inch may be allowed between the cylinder wall and the plunger and skirt. A slot or longitudinal opening 35, the width of which may correspond to the diameter of the opening 9, is cut in the skirt 31. A second slot 37 corresponding to the length of the slot 35 and corresponding in width to the opening 11 is also cut in the skirt 31. Both slots may extend to within a short distance of the ends of the skirt. The slots 35 and 37 are preferably spaced at approximately ninety degrees from each other, measured from center to center. The plunger wall 29 may have an opening in the center thereof provided with threads in order to enable one end of the rod 25 to be screwed therein. A lock nut 39 may be placed on the rod 25 adjacent to the end attached to the plunger wall 29 in order to firmly hold the rod in the plunger. The outer end of the rod 25 is provided with a handle 41 which may be screwed onto the rod or otherwise fastened thereto. A suitable lock nut 43 may be placed on the end of the rod to prevent the handle from turning.

Although the inlet opening 9 has been shown as being larger than the outlet opening 11, it will be understood that the openings may be of the same size or the outlet opening may be of larger size. The size of the openings will be determined by the consistency of the material to be measured and fed to the container and the size of the container to be filled. It is preferable to have the inlet opening 9 of as large size as possible in order to reduce the friction in drawing the material from the hopper into the measuring and feeding device.

It will be apparent the length of the cylinder is greater than that of the plunger element including the skirt but the length and size of the cylinder 7 and the length of the skirt 31 may vary with the quantity of material to be fed at each stroke of the plunger. The device, however, should be so constructed that the end of the skirt 31 and the plunger wall 29 do not pass beyond the inlet or outlet on either stroke. For example, when handle 41 is pulled rearward in order to draw material into the cylinder 7, the end 33 of the skirt will not pass backward beyond the left side of the openings 9 and 11. Likewise when the plunger is pushed forward to the end of its stroke the rear wall 29 of the plunger will not pass beyond the right side of the openings 9 and 11. This insures delivery of a fixed amount of material on each stroke and prevents any likelihood of air getting into the cylinder.

Although the openings 11 and 9 are shown as being slightly off center, it is understood that the opening 9 may be directly above the opening 11.

The caps 17 and 21 may be screwed inwardly and outwardly in order to shorten or lengthen the stroke of the plunger, thereby decreasing or increasing the amount of material fed by the operation thereof.

Although the slots 35 and 37 have been described as being spaced at approximately ninety degrees on the circumference of the skirt 31, it is to be understood that the distance may vary but it is important that the slots be spaced at such a distance that the skirt 31 may be turned so that in one position the solid face of the skirt entirely closes the opening 9 and the slot 37 coincides with the opening 11 thereby providing a free passage from the cylinder to the outlet, and in the other position the slot 35 coincides with the opening 9 thereby providing a clear passage from the hopper to the cylinder, and the opening 11 will be entirely closed by the solid face of the skirt 31. This insures closing of the inlet at the time material is being discharged from the cylinder and also insures complete closure of the outlet at the time material is being charged into the cylinder. In place of two slots or openings, a single slot or opening may be placed in the skirt 31 and in that case it will be necessary to turn the skirt through a greater arc in charging and discharging the cylinder 7.

It will be readily understood from the previous description that the plunger 27 including the skirt 31 may be rotated in the cylinder 7 by turning the handle 41. Although the apparatus as shown is adapted to be operated by hand, a suitable mechanism may be connected to the outer end of the rod 25 in order to impart reciprocating motion to the plunger element and rotating motion thereto at the end of each stroke.

The operation of the device will be described in connection with the filling of grease cans, but it is to be understood that the device is applicable to the filling of cans with other semi-fluid or semi-plastic materials. Hopper 1 is filled with grease which may be heated to the proper consistency prior to the introduction into the hopper 1, or may be heated or maintained in the hopper 1 at the proper temperature by means of a steam, water, or other heat exchange medium passed through a jacket surrounding the hopper. It is essential that the grease is not heated too highly since its homogeneity and texture will be destroyed and the grease will lose its value for lubricating purposes. An unworked consistency of 140 to 400 and preferably from 280 to 320, as determined by the penetrometer method of the A. S. T. M. designated D 217—33T, is suitable. In some cases it will be necessary to heat the grease somewhat in order to bring it to this consistency. In any case the grease should not be heated to a temperature in excess of approximately 200° F. since the grease deteriorates above this temperature.

After the grease has been brought to the proper consistency, the plunger element 27 is pulled rearward to the end of its stroke by pulling on the handle 41 while the skirt is in such position that the slot 35 is in coincidence with the opening 9. If the cylinder 7 is not entirely filled with grease during this stroke, it may be filled through the end 15 in order to start the machine working properly. After the cylinder 7 is completely filled and the cap 17 replaced, the handle 41 is turned clockwise through ninety degrees in order to close off the opening 9 and bring the slot 37 in registry with the opening 11 and the plunger then pushed forward to the full extent of its stroke. During the forward movement of the plunger, an assistant places a can directly under the outlet 13 and preferably moves the can downwardly as it becomes filled. This technique insures proper filling of the can without occlusion of air. It will be evident that the front end 15 of the cylinder 7 will act as a dead space in which a quantity of grease will always remain and this grease acts as a cushioning means for the plunger during the forward stroke. Having completed the forward stroke the plunger element is then turned counter-clockwise through ninety degrees by means of the handle 41 so that the opening 11 is closed by the solid face of the skirt 31 and the slot 35 is brought in registry with the opening 9. In this position the plunger element is drawn backwardly to its rearward position and during this stroke grease is drawn from the hopper 1 into the cylinder 7 to again fill it in readiness for the next delivery stroke.

The operation of the apparatus just described is extremely rapid and by means of hand operation enables approximately 1000 to 1200 one-pound cans to be filled per hour. By reason of its simplicity no time is wasted in starting up the apparatus which would be necessary with more complicated automatic machinery. It has been found that the apparatus above described when properly operated will fill cans at a rate greater than 50% of the rate at which mechanically actuated filling machines are operated and for small jobs, actually saves time.

Although I have described the operation of the machine in a manner which necessitates movement of the containers below the outlet, by hand, it is possible by means of a set of levers connected to the rod 25 to raise and lower a platform beneath the outlet 13 in coordination with the movement of the handle 41 so that the can can be moved downwardly at the proper rate during the time it is filled.

The apparatus is suitable for filling cans of from 1 to 5 pounds capacity. The mechanism is extremely accurate and will deliver within a fraction of an ounce of the quantity intended. As previously pointed out, the caps 17 and 21 may be adjusted in order to regulate the length of the stroke of the plunger in order to adjust the delivery so that if the amount is slightly more or less than the amount required, it can be corrected by screwing the caps inwardly or outwardly respectively. By combining the charging, discharging, and valve mechanism in a single element I have succeeded in providing a simple, rapid and economic apparatus for filling containers with a measured amount of non-flowable or difficult flowable material.

What I claim is:

1. A portable feeding and measuring device comprising a cylinder closed at one end and open at the other, an inlet and an outlet intermediate the ends of said cylinder, said inlet being connected to a hopper, a piston slidably mounted in said cylinder, a slotted hollow skirt slidably and rotatably mounted in said cylinder, said skirt being affixed to and being adapted to move integrally with said piston, a cap screwably mounted on the open end of said cylinder, having an opening in the middle thereof sufficiently large to permit a rod fastened to the piston to pass therethrough, a handle on the outer end of said rod to permit manual operation of said piston, said cap acting as a stop means for said piston at the end of the rearward stroke thereof and permitting an adjustment of the stroke of said piston.

2. Device in accordance with claim 1 in which the opening in the cap is large enough to admit air freely into the portion of the cylinder behind said piston.

3. A portable feeding and measuring device comprising a cylinder closed at one end and open at the other, an inlet and an outlet intermediate the ends of said cylinder, said inlet being connected to a hopper, a piston slidably mounted in said cylinder, a slotted hollow cylindrical skirt in said cylinder affixed to and adapted to move integrally with said piston, the total length of said skirt and piston being less than the inside length of the cylinder but of sufficient length to cover said inlet and outlet during all portions of the piston stroke, a cap screwably mounted on the open end of said cylinder having an opening centrally thereof sufficiently large to permit a rod fastened to the piston to pass therethrough, a handle on the outer end of said rod to permit manual operation of said piston, said cap acting as a stop means for said piston at the end of the rearward stroke thereof and permitting adjustment of the piston stroke.

PAUL F. STOCKARD.